United States Patent
Kunjali et al.

(10) Patent No.: US 9,751,779 B1
(45) Date of Patent: Sep. 5, 2017

(54) THREE-ELECTRODE STRUCTURE FOR CAPACITIVE DEIONIZATION DESALINATION

(71) Applicant: SULTAN QABOOS UNIVERSITY, Muscat (OM)

(72) Inventors: Karthik Laxman Kunjali, Muscat (OM); Joydeep Dutta, Stockholm (SE)

(73) Assignee: SULTAN QABOOS UNIVERSITY, Muscat (OM)

( * ) Notice: Subject to any disclaimer, the term of this patent is extended or adjusted under 35 U.S.C. 154(b) by 0 days.

(21) Appl. No.: 15/295,972

(22) Filed: Oct. 17, 2016

(51) Int. Cl.
*C02F 103/08* (2006.01)
*C02F 1/469* (2006.01)
*C02F 1/46* (2006.01)

(52) U.S. Cl.
CPC .......... *C02F 1/4691* (2013.01); *C02F 1/4604* (2013.01); *C02F 2201/46* (2013.01)

(58) Field of Classification Search
CPC ....................................................... C02F 1/469
See application file for complete search history.

(56) References Cited

U.S. PATENT DOCUMENTS

| | | | | |
|---|---|---|---|---|
| 5,584,981 | A * | 12/1996 | Turner | B01D 61/48 204/536 |
| 6,607,647 | B2 | 8/2003 | Wilkins et al. | 204/523 |
| 8,557,098 | B2 | 10/2013 | Kim et al. | 204/633 |
| 2007/0158185 | A1 | 7/2007 | Andelman et al. | 204/229.7 |
| 2007/0272550 | A1 | 11/2007 | Shiue et al. | 204/267 |
| 2012/0037511 | A1 * | 2/2012 | Xiong | C02F 1/4604 205/746 |
| 2014/0183045 | A1 | 7/2014 | Fu et al. | 204/520 |
| 2015/0064501 | A1 | 3/2015 | Ren et al. | 429/2 |

FOREIGN PATENT DOCUMENTS

| | | | | |
|---|---|---|---|---|
| JP | 2000-263058 | A * | 9/2000 | ............. C02F 1/469 |
| JP | 2006305407 | | 11/2006 | |
| KR | 1020050020298 | | 3/2005 | |
| KR | 1020050022496 | | 3/2005 | |

OTHER PUBLICATIONS

JPO computer-generated English language translation of JP 2000-263058 A. Downloaded Dec. 16, 2016.*

* cited by examiner

*Primary Examiner* — Alexander Noguerola
(74) *Attorney, Agent, or Firm* — Richard C. Litman

(57) ABSTRACT

The three-electrode structure for capacitive deionization desalination is a system for desalination of a fluid containing charged species and a process thereof. A capacitive deionization cell has at least three electrodes, wherein the first electrode is connected to either the positive or the negative potential, a second electrode, which is connected to a potential equal in magnitude but having a polarity opposite to that of the first electrode, and a third central electrode, which is placed between the first and second electrodes and is connected to a reference potential.

7 Claims, 7 Drawing Sheets

THREE-ELECTRODE STRUCTURE FOR CAPACITIVE DEIONIZATION DESALINATION

BACKGROUND OF THE INVENTION

1. Field of the Invention

The present invention relates to a system for desalination of a fluid containing charged species, and particularly to a three-electrode structure for capacitive deionization desalination.

2. Description of the Related Art

Capacitive deionization (CDI) involves the electrostatic- or applied potential-mediated attraction/repulsion of ions from water to oppositely charged electrode surfaces, thus depleting the ion concentration in liquids, such as water. Positive ions (or cations) like sodium ($Na^+$) will be attracted to the negative electrode (cathode), and negative ions (or anions) like chlorine ($Cl^-$) will be attracted to the positive electrode (anode).

Existing systems include methods for desalting water and dewatering of suspensions using a combination of attraction and repulsion of ions. These systems use only a 2-electrode systems connected to a DC power supply and ion exchange materials for selective adsorption and repulsion.

These conventional CDI cell designs assume that the potential applied is equally distributed between the two or more electrodes within the cell, thus enabling equal adsorption of both anions and cations from the water stream, i.e., if 'X' volts are applied across the electrodes, it will be divided into +'X/n' and –'X/n' volts, where 'n' is the number of electrodes in the CDI cell, thus forming alternate positive and negative electrodes, or a single positive and negative electrode in case of a two-electrode CDI cell.

Because the potential is not equally divided between two electrodes, there is an uneven flux of energy, and thereby leading to the removal of merely cations because of predominant positive potential.

Thus, a three-electrode structure for capacitive deionization desalination solving the aforementioned problems is desired.

SUMMARY OF THE INVENTION

The three-electrode structure for capacitive deionization desalination includes three electrodes, the first electrode being connected to either the positive or the negative potential, the second electrode being connected to a potential having equal magnitude but a polarity opposite to that of the first electrode, and a third central electrode placed between the first and second electrodes and connected to a reference potential, the central electrode being a conductive perforated plate having dimensions equal to the first and second electrodes. The perforations could be in the form of holes or strips, or in the form of a ring, and the central electrode has a surface area that is negligible compared to the first and second electrode.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The three electrode structure for capacitive deionization desalination relates to a system that comprises at least three electrodes, the first electrode being connected to either the positive or the negative potential, the second electrode being connected to a potential equal in magnitude but having a polarity opposite to that of the first electrode, and a third central electrode placed between the first and second electrodes and connected to a reference potential, the central electrode being a conductive perforated plate with dimensions equal to the first and second electrodes. The perforation(s) could be in the form of holes or strips or in the form of a ring, and the central electrode has a surface area that is negligible compared to the first and second electrode.

The three electrodes are housed in a watertight casing, and between the casing and the extreme electrodes a current collector is inserted. The first and second electrode may be of different materials that may be porous and have an equal high or low surface area, but preferably a high surface area, and which is electrically conductive in nature.

The central electrode is also electrically conductive in nature and has a bipolar nature, wherein the side of the central electrode facing the anode is negative with respect to the side facing the cathode, which is positively polarized. The central electrode is encapsulated by a spacer material. The spacer material is nonconductive in nature and can be any material that allows the flow of ions through it. The spacer encapsulates the central electrode to avoid an electrical short between the central and the at least two extreme electrodes, while also electrically isolating the two extreme (first and second) electrodes.

The central electrode may be a perforated plate that does not hinder in any way the flow of water, ions, and energy between the at least two extreme electrodes (first and second electrodes). In one embodiment, the central electrode is in the form of a ring with dimensions similar to that of the at least two extreme electrodes, thus allowing free flow of energy and ions between the two extreme electrodes (first and second electrode), so that the central electrode has a negligible surface area for adsorption of ions in comparison to the at least two extreme electrodes.

Figure 1:
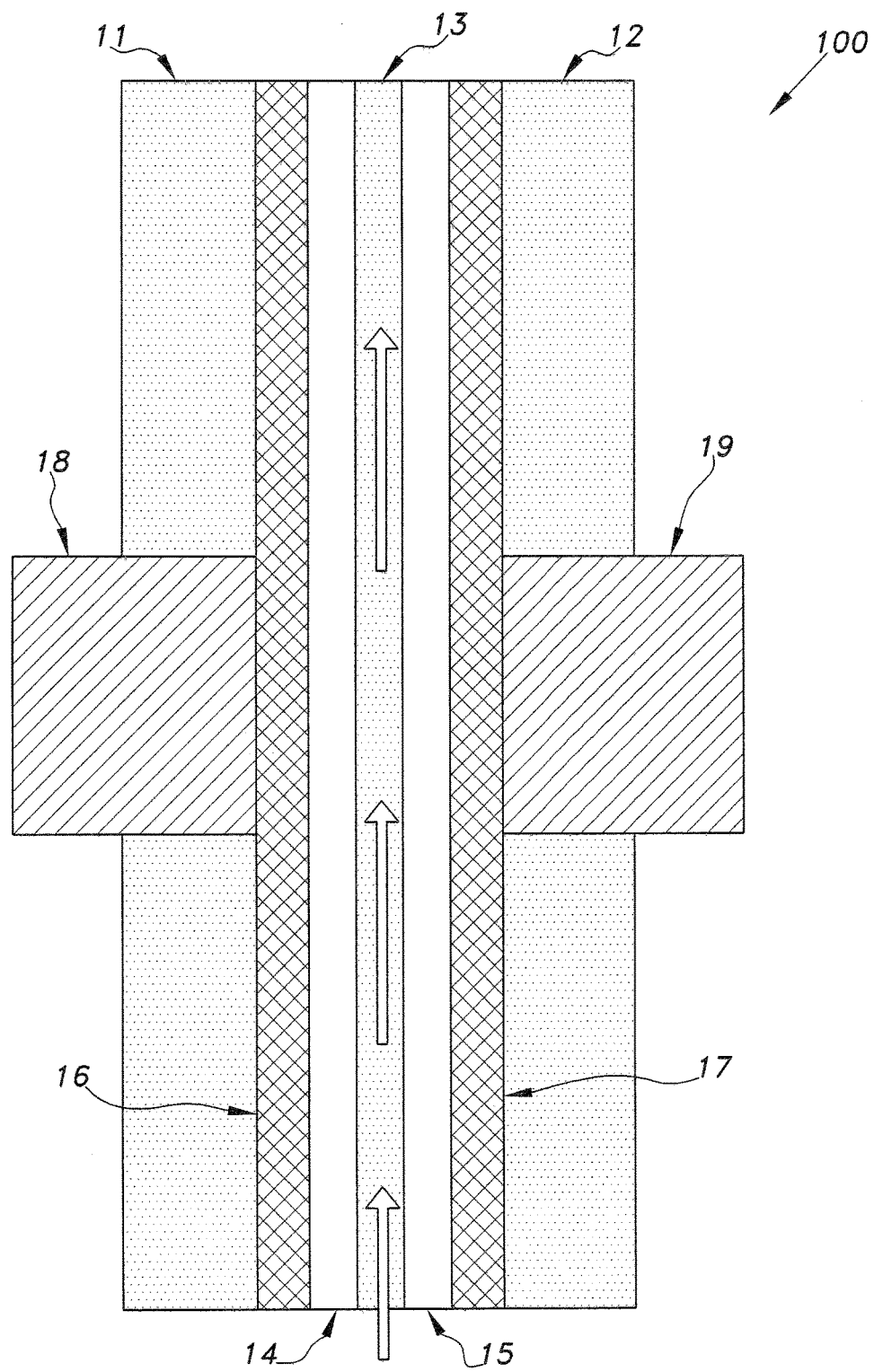
FIG. 1 is a side view in section of a three-electrode structure for capacitive deionization desalination according to the present invention, illustrating a capacitive deionization (CDI) cell.
Figure 2:
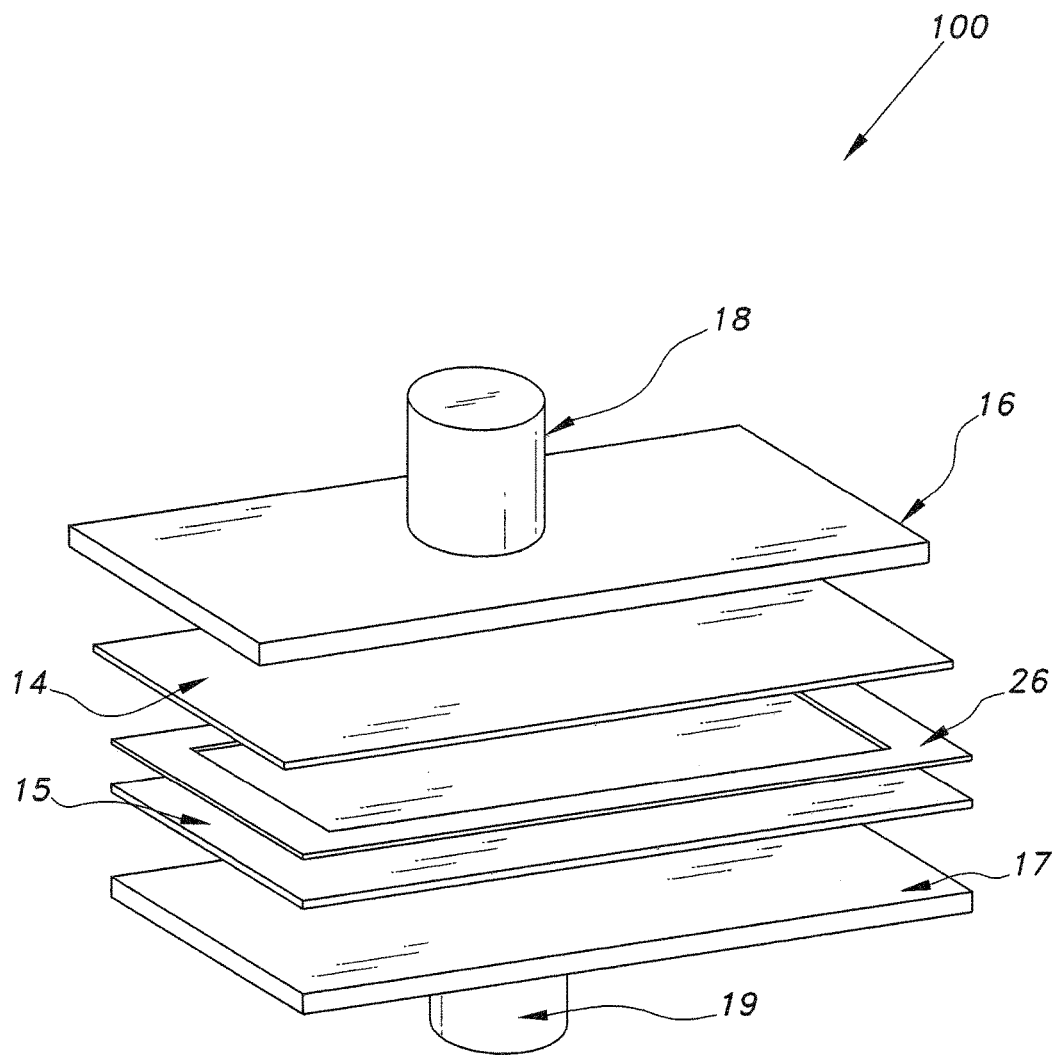
FIG. 2 is an exploded perspective view of the three-electrode structure for capacitive deionization desalination of FIG. 1, showing individual components of the CDI cell.

FIG. 1 shows a cross section of a capacitive deionization cell 100, which includes a watertight casing having a left side 11 and a right side 12. A first current collector 16 is disposed inside the casing along the casing's left side 11. A second current collector 17 is disposed inside the casing along the casing's right side 12. Cylindrical electrodes 18 and 19 extend at right angles away from the left 11 and right 12 sides of the casing. Each electrode 18, 19 is in electrical contact with its respective current collector 16, 17. An elongate, central electrode 13 is disposed inside the casing and extends from top to bottom of the casing, being centrally located between and spaced apart from the first current collector 16 and the second current collector 17. This electrode configuration inside the casing forms a left water channel 14 and a right water channel 15, both water flow channels 14, 15 extending from top to bottom of the casing. The cylindrical electrodes 18 and 19 and the central electrode 13 (CE) are connected to a power supply 310 (shown in FIG. 3). The CE 13 is connected to a reference potential. The two electrodes 18, 19 are connected to positive and negative potentials of equal magnitude, respectively. The CE 13 is encapsulated by a spacer channel (water flow channels 14 and 15) on either side, through which water flows between the electrodes. FIG. 2 shows the electrode configuration of the CDI exploded away from the casing. The electrodes 18 and 19 used in the cells have a cylindrical form, but other shapes, including rectangular, square, and other polygonal forms, are also possible. In the embodiment shown in FIG. 2, the central electrode 26 (CE) is in the form of a rectangular ring of peripheral dimensions similar to the first and second current collectors 16, 17, and has an edge thickness of 1 mm, but other shapes, including round, square, mesh-type, and other polygonal forms, are also possible, and other magnitudes of edge thickness are also possible. The shape, size, and edge thickness of the CE 26 are chosen to minimize the barrier for ionic flow between the first and second current collectors 16, 17. Furthermore, the material of the CE 26 may be porous or non-porous and is chosen to be easy to handle, cost-effective, chemically inert, and electrically conductive in nature, and to provide a low surface area for ion adsorption, preferably less than 0.1 $m^2/g$. Moreover, the CE material is not corroded by the flowing salt solution. When the capacitive deionization cell, with the electrodes 18 and 19 connected to their respective current collectors 16 and 18 and to the CE 26, is used for desalination, feed salt water flows through the water flow channels 14 and 15, the flow channels 14 and 15 being disposed on either side of the CE 26. Positive and negative potentials are applied at the current collectors connected to the electrode 18 (which functions as an anode) and to the electrode 19 (which functions as a cathode) of the CDI cell 100.

The electrodes of the CDI cell are powered by positive, negative and a reference potential. To supply the three different polarities of potential, a center-tapped transformer is used in the power supply design. The central terminal of the transformer is used as the reference and connected to the central electrode, while the other two terminals act as the positive and negative voltage polarities. The positive and negative transformer terminals are passed through a diode rectifier and capacitor filter to generate a uniform DC output. The DC output is then regulated through positive and negative voltage regulators (IC 7805 for positive and IC 7905 for negative supplies). The output of each regulator is connected to a potentiostat to modulate the voltage at the required positive and negative potential magnitudes. Two separate ammeters were connected in the positive and negative voltage loops to record both the anionic and cationic charging and discharging currents. Three switches are incorporated, one each for each supply terminal (positive, negative and reference). During the desalination stage, the switches at the three terminals are shorted horizontally. Thus, the anionic charging current is positive and the cationic charging current is negative, and vice versa during regeneration. During the regeneration phase, the switches are shorted vertically to short all three electrodes in the CDI cell for fast regeneration.

Figure 3:
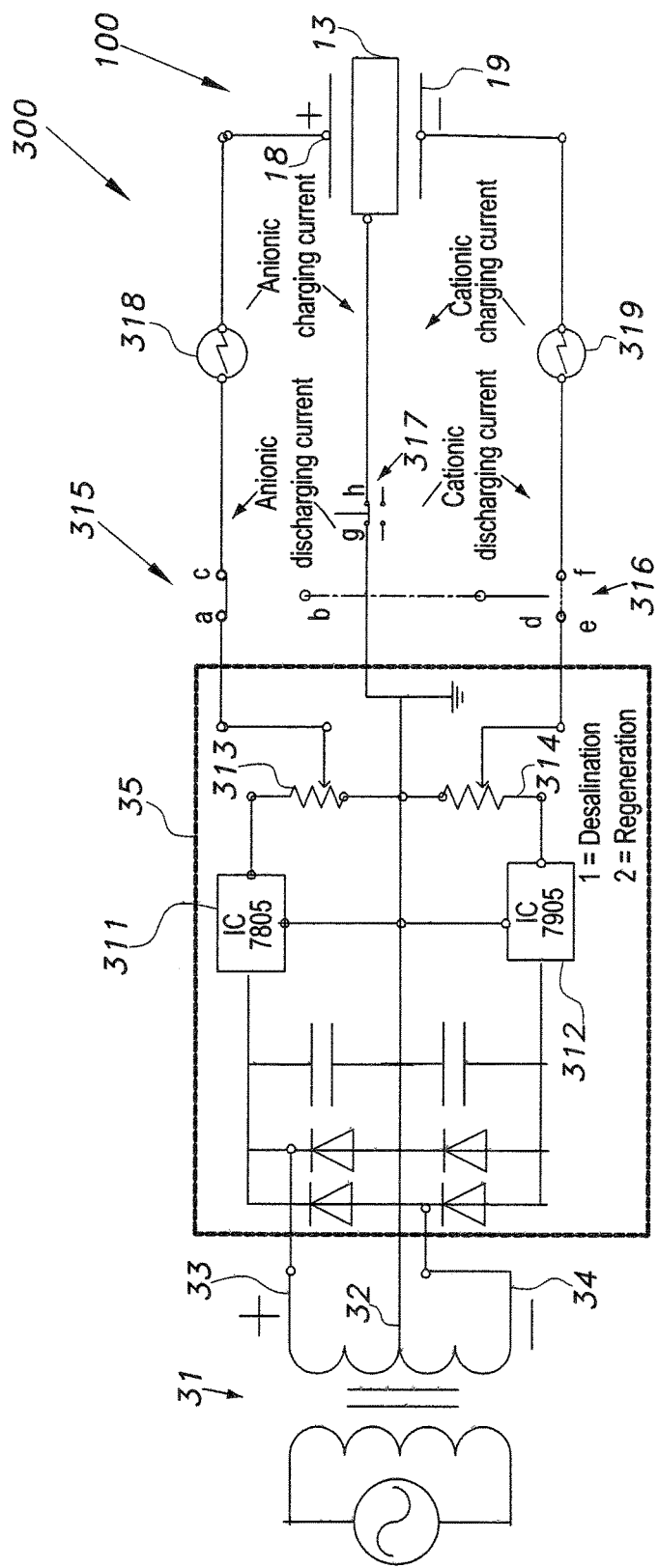
FIG. 3 is a schematic diagram of a three-electrode structure for capacitive deionization desalination according to the present invention connected to a power supply.

FIG. 3 shows a schematic of the power supply 310, which is used to energize the electrodes 18, and 19, consequently their respective current collectors 16 and 17, and the central electrode 13 of the capacitive deionization (CDI) cell 100.

The modified power supply 300 includes a center-tapped transformer 31 with positive output terminal 33, central terminal 32, and negative output terminal 34, and is used for powering the device. The central terminal 32 is used as the reference potential, which is generally considered as the circuit ground, while the positive and negative terminals 33 and 34 energize the positive and negative potential carrying electrodes 18 and 19, which are connected via potential control circuits 35 to the two electrodes 18 and 19 of the capacitive deionization cell 100. Terminal 34 of the transformer is negative and connected to the CDI cell cathode 19, while transformer terminal 33 is positive and connected to the CDI cell anode 18. The central terminal 32 is the reference and is connected to the central electrode 13 placed in-between electrodes 18 and 19. The positive and negative terminals 33, 34 of the power supply 300 are connected to positive and negative voltage regulator circuits 311 and 312 to limit the voltage below a specified value, in this case, +5V and −5V DC. Voltage regulator outputs are connected to potentiostats 313 and 314. The output of the potentiostats 313 and 314 is varied to control the magnitude of the potential to be applied to the anode and cathode of the CDI cell. In this embodiment, the output of the potentiometer 313 is limited to +0.8 V across the anode, and the output of the potentiometer 314 is limited to −0.8V across cathode, giving a total potential difference of 1.6 V between the anode and cathode, but other potential ranges are also possible.

During the ion desalination or charging process, switch 315 has its 'a' and 'c' terminals shorted, leading to the current flow required for anion adsorption to flow from the positive/upper transformer terminal via the potential controlling potentiostat through the first ammeter 318 into the CDI cell anode terminal (Anionic charging current). Similarly, switch 316 also has terminals 'd' and 'f' shorted, leading to the current flow required for cation adsorption to flow from the negative/lower transformer terminal via the potential controlling potentiostat through the second ammeter 319 into the CDI cell cathode terminal (Cationic charging current). Thus, the anion charging current will be positive, while the cation charging current will be negative in polarity. Switch 317, which is connected to the central transformer terminal and into the circuit ground, has terminals 'g' and 'h' shorted, giving the CE of the CDI cell the same potential as the circuit ground. During regeneration or discharging process, terminals 'a' and 'b' of switch 315 and terminals 'f' and 'd' of switch 316 are shorted, short circuiting the anode and cathode of the CDI cell, while switch 317 has terminals 'g' and 'h' disconnected and 'h' connected to 'f', connecting it to the same potential as 315 and 316. The charge stored in the CDI cell electrode will flow as current across the CDI anode and cathode in continuous loops until all the ions held by the charged electrode surface are removed into the solution. Anionic discharge current will flow from the CDI cell anode through the first ammeter 318 into switch 315 and towards circuit ground, while the cationic discharge current will flow from the CDI cell cathode through the second ammeter 319 into switch 316 and towards the circuit ground. Since the direction of current flow is opposite during discharging, anionic discharge current is negative while the cationic discharge current is positive.

Figure 4:
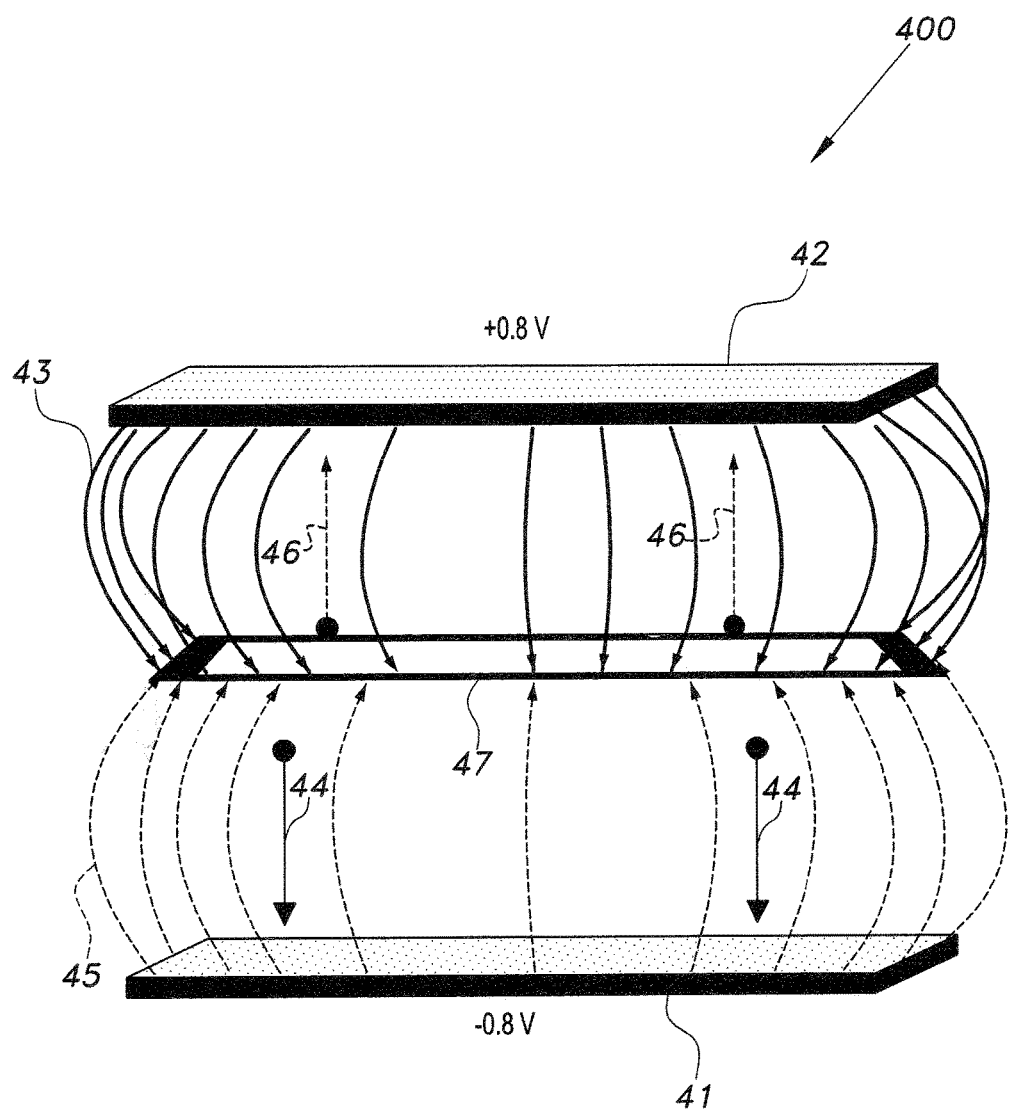
FIG. 4 is a schematic diagram of a three-electrode structure for capacitive deionization desalination according to the present invention, showing electric field line distribution in a capacitive deionization (CDI) cell.

FIG. 4 is a schematic diagram illustrating that when a specified potential is applied to a CDI cell 400 through the power supply, a cathode 41 of the cell assumes a potential that is the specified potential lower than the reference electrode, while the anode 42 of the cell has a potential that is the specified potential higher than the reference electrode. As an example, if the potential at the reference potential is 0 V DC, and the applied potential is 0.8 V DC, then the CDI cell cathode has a potential of −0.8 V and the anode of the cell has a potential of +0.8 V, and the total potential difference between the cathode and anode is 1.6 V DC. The insertion of the CE 47 forces the potential at each extreme electrode to be of the same magnitude, but of opposite polarity, thus equally distributing the applied energy between the two extreme electrodes. The applied potential leads to the presence of an electric field between the CDI cell electrodes. From electric field theory, an electric field is defined as lines of force starting at the positive electrode and terminating at the cathode, and its magnitude is the repulsive force experienced by a unit positive charge (+Q) placed within that electric field. Similarly, a unit negative charge (−Q) placed in the same field will experience a repulsive force from electric field lines extending from the cathode towards the anode.

Due to forced symmetry in the distribution of potential energy on the two master electrodes, the magnitude of the lines of force extending from the anode 42 to the CE 47 and from the CE 47 to the cathode 41 and from the cathode 41 to the CE 47 and from the CE 47 to the anode 42 of the CDI cell 400 are equal in magnitude and opposite in nature. Electric field lines 43 extending from the anode 42 to the CE 47 repel the cations in solution towards the CE electrode 47, while the potential of the CE electrode 47 is higher than that of the cathode 41, giving rise to a second set of field lines 45 of equal magnitude extending from the CE electrode 47 to the cathode 41 of the CDI cell, forcing the cations 44 from the CE 47 to the cathode 41. Thus, both the first set of field lines 43 and second set of field lines 45 repel the cations towards the cathode 41, while an equal and opposite attractive force generated at the cathode leads to cation adsorption at the cathode and their subsequent removal from the water. Similarly, electric field lines 45 extending from the cathode to the CE and subsequently from the CE to the anode to repel the anions 46 towards the anode 42 of the CDI cell 400. Combined with an equal and opposite attractive force generated at the anode, cations from solution are adsorbed onto the CDI cell cathode and removed from the solution bulk. When water containing ions is flowing between the positive and negative electrodes and the central electrode, anions will be repelled from the cathode and attracted by the anode, while cations will be repelled from the anode and attracted by the cathode, giving rise to ion adsorption, which depletes the water of ions, leading to deionization. The water may comprise salt water, wherein adsorption of ions leads to desalination of the water.

Figure 5:
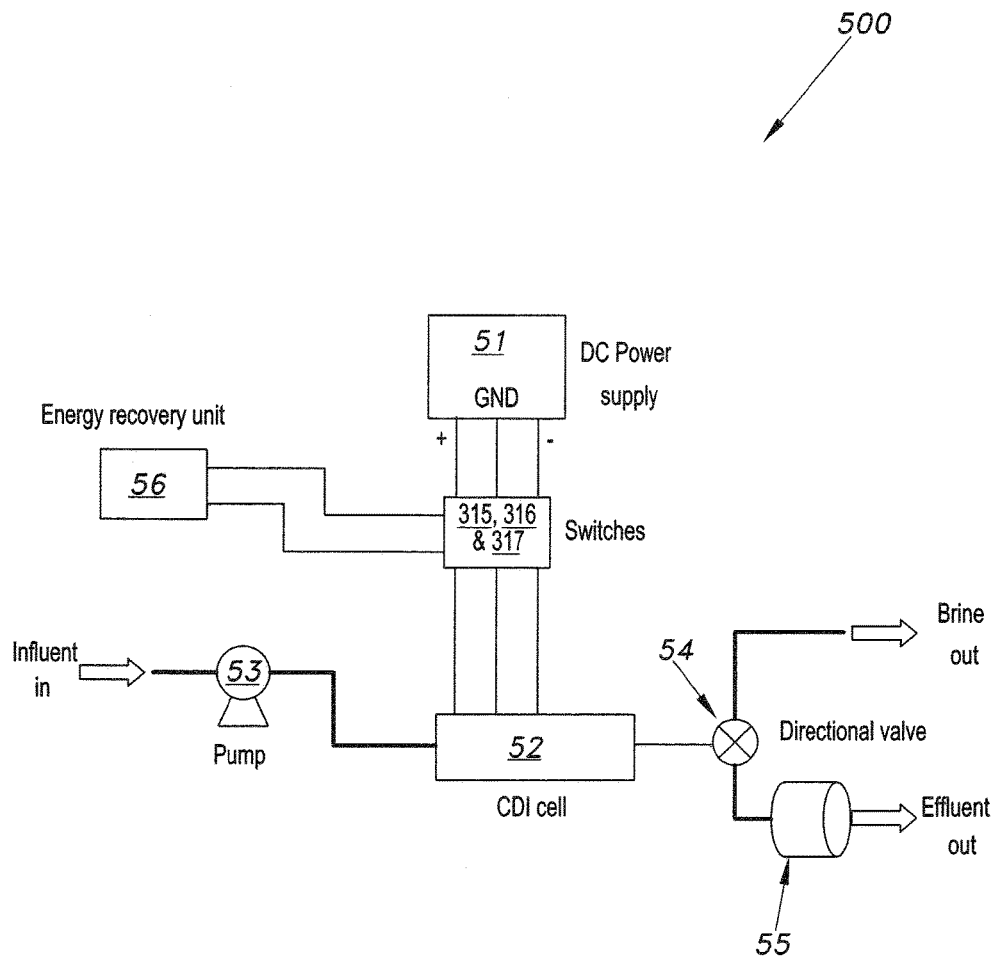
FIG. 5 is a block diagram of a test configuration for a three-electrode structure for capacitive deionization desalination according to the present invention.

FIG. 5 shows a block diagram set up of a CDI unit to desalt brackish water. Power to the CDI unit is supplied by the three terminal power supply 51 using the switches 315, 316 and 317, which are connected to the CDI cell 52. Saline feed (influent) water is pumped into the CDI 52 cell using a peristaltic pump 53. Output of the CDI cell is connected to a two-way valve 54, from which the desalted water and brine discharge are collected. Efficiency of ion removal is measured by connecting a flow-through conductivity meter 55 at the outlet of the CDI cell. A reduction in the water conductivity is directly proportional to the quantity of ions removed.

The current flowing out of the CDI anode and cathode during regeneration or discharging may be connected to an energy recovery unit 56. The energy recovery unit 56 can be a battery or a capacitor, or any other device capable of storing energy by passing a current through it. The stored energy may subsequently be used to power another CDI cell, reducing the total power consumption of the system.

As an example, we compared the ion removal efficiency of a CDI cell comprising two extreme electrodes and at least one CE with that of a CDI cell comprising only two extreme electrodes and no CE. The two electrode cell was termed as the diode, while the three electrode cell is known as the triode. With an additional CE inserted between the two extreme electrodes, the distance between the electrodes increases, which should theoretically lead to a decrease in the cell capacitance, as per equation (1), which states that cell capacitance is directly proportional to the surface area of the electrode and inversely proportional to the distance between the electrodes.

$$C \propto \frac{A}{D} \qquad (1)$$

The flow rate of the water was fixed at 3 ml/min, while the potential applied was limited to 1.6 V DC. For the two extreme electrode CDI cell (diode), the potential was applied from a DC power supply using a two-terminal output, which are the positive 1.6 V DC and the CE or circuit ground, while for the two extreme electrode and at least one CE CDI cell, potential was applied from the three-terminal DC power supply, wherein the central terminal is connected to the at least one CE and the two extreme electrodes are connected to the positive and negative terminals of the power supply. The potential between the cathode and CE is −0.8 V, and the potential between the anode and CE is +0.8V, thus making the total potential difference between the anode and cathode of the CDI cell equal to 1.6 V DC. Water was passed through the two CDI cells while the potential was applied, and the conductivity of the water was monitored at the output of the cell to measure the desalination efficiency of the two cells. Simultaneously, the current during the charging and discharging process was also measured to calculate the power consumption of the desalting process and estimate the total power consumption per $m^3$ or 1,000 liters of water desalted. The results for the desalination process are given below:

TABLE 1

Comparison of diode and triode CDI cell structures

| Configuration | Desalination Efficiency (%) | Energy/mol of salt ads (Joules/mol) | Specific salt ads (mg/g) | Energy Recovery (%) | Charge Efficiency (%) | Power/$m^3$ of water desalted (drinking) |
|---|---|---|---|---|---|---|
| Diode | 27 | 3.27E+03 | 8.75 | 89 | 77 | 0.76 |
| Triode | 39 | 1.68E+03 | 12.5 | 91 | 91 | 0.6 |

Figure 6:
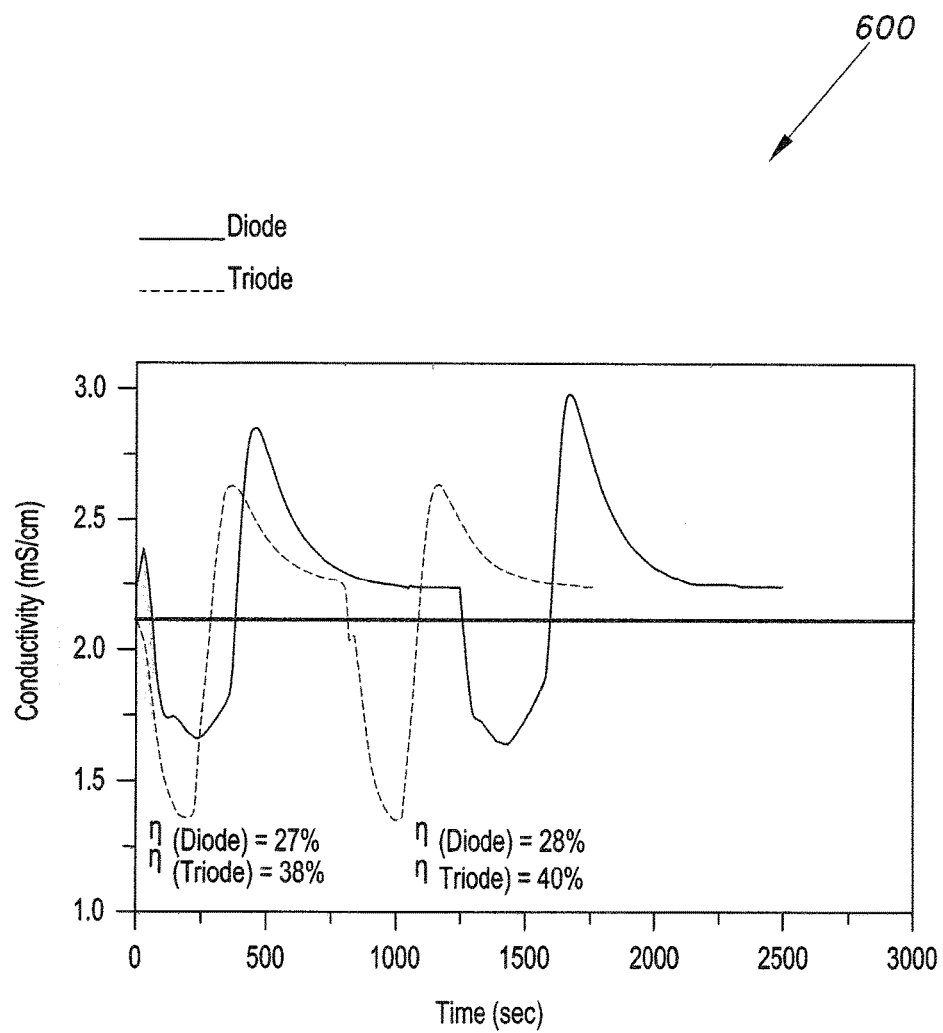
FIG. 6 is a plot comparing conductivity curves for diode and triode CDI cells.
Figure 7:
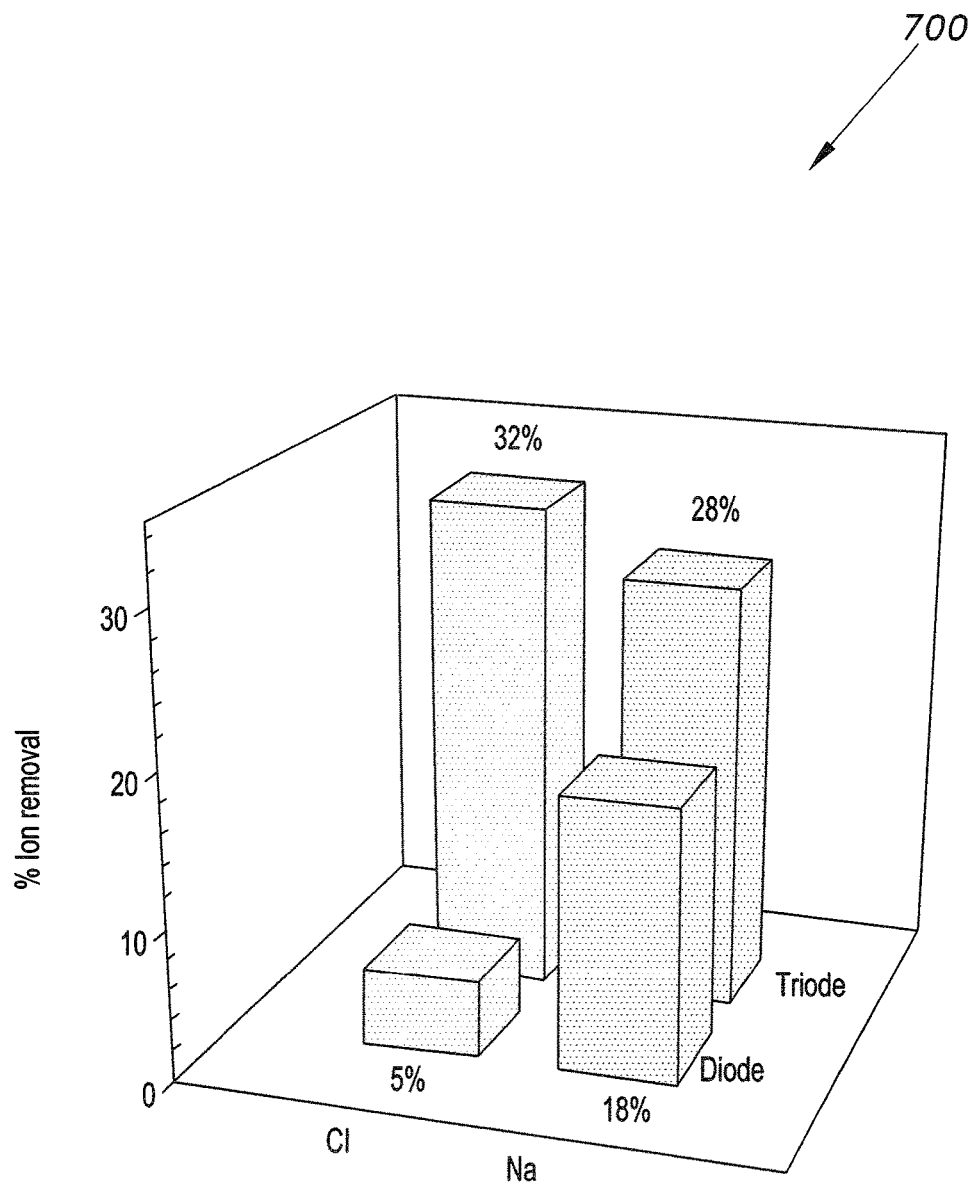
FIG. 7 is a histogram chart illustrating anion and cation removal efficiencies for diode and triode (CDI) cell configurations.

From plot 600 of FIG. 6, we can see that the ion removal efficiency of the three electrode CDI cell or triode is better than the two electrode CDI cell or diode by almost 40%. Graph 700 of FIG. 7 suggests that the increase in salt removal efficiency for the triode could be due to the symmetric removal of both anions and cations, attributed to the well-distributed potential leading to equal and opposite electric fields present between the electrodes. The symmetric repulsion of cations from the anode and anions from the cathode with simultaneous adsorption at the co-electrodes leads to efficient removal of both ions from the water, leading to enhanced desalination efficiencies. In comparison, for the diode, there is repulsion of cations from the CDI cell anode, leading to their removal, but because the other cathode is a reference electrode with a potential close to 0 V DC, there is no repulsion of anions in solution, limiting their removal efficiency, as seen in FIG. 7. The results also suggest that repulsion is an important aspect for ion removal and cannot be disregarded.

The efficient removal of the ions from the water feed stream also reduces the power consumption for the entire process, as illustrated in Table 1. Simultaneously, a 30% increase in the salt adsorption capacity (ads) was also evident, along with a 15% improvement in the charge efficiency of the device. Charge efficiency basically defines the ratio of charge input in coulombs to the cell to the charge adsorbed in terms of ions removed from the water stream. A charge efficiency of 100% means that for every charge input to the cell, one charge equivalent of ions is removed from the cell. Ions removed can be converted to equivalent charge in coulombs by calculating the moles of ions removed and multiplying it by the Faraday constant, which gives us the equivalent charge in moles. The Faraday constant has an absolute value of 96485.3365 Coulombs/mol of ions.

It is to be understood that the present invention is not limited to the embodiments described above, but encompasses any and all embodiments within the scope of the following claims.

We claim:

1. A three-electrode structure for desalination having a capacitive discharge ionization (CDI) cell, the capacitive discharge ionization cell, comprising:
   a watertight casing having a left side and a right side;
   a conductive first current collector disposed inside the casing along the casing's left side;
   a conductive second current collector disposed inside the casing along the casing's right side;
   a positive electrode and a negative electrode extending at right angles away from the left and right sides of the casing, respectively, the positive electrode being in electrical contact with the first current collector, the negative electrode being in electrical contact with the second current collector;
   a central electrode (CE) disposed inside the casing and extending from top to bottom of the casing, the central electrode being centrally located between and spaced apart from the first current collector and the second current collector, the central electrode defining a perforated plate, a non-conducting, ion permeable material encapsulates the central electrode and electrically isolating the positive and negative electrodes from the central electrode;
   a first water flow channel between the positive contacting current collector and the material encapsulating the central electrode and a second water flow channel between the negative contacting current collector and the material encapsulating the central electrode, the water flow channels extending from top to bottom of the casing and allowing influent and effluent water flow through the CDI cell, wherein the flow channels are defined by a nonconductive, first planar water flow channel spacer disposed between the first current collector and the material encapsulating the CE and a nonconductive, second planar water flow channel spacer disposed between the second current collector and the material encapsulating the CE; and
   a voltage source supplying a reference potential to the central electrode, a positive potential relative to the reference potential to the positive electrode, and a negative potential relative to the reference potential to the negative electrode, the positive and negative potentials being equal in magnitude but opposite in polarity, wherein the voltage source comprises a three-terminal DC power supply having neutral, positive and negative voltage outputs, the neutral voltage output being connected to the CE, the positive voltage output being connected to the positive electrode, and the negative voltage output being connected to the negative electrode.

2. The three-electrode structure for desalination according to claim according to claim 1, further comprising:
   means for reversing the polarity of the power supply voltage output connected to the positive electrode; and
   means for reversing the polarity of the power supply voltage output connected to the negative electrode.

3. The three-electrode structure for desalination according to claim according to claim 2, further comprising:
   means for regulating the voltage delivered by the power supply's positive voltage output; and
   means for regulating the voltage delivered by the power supply's negative voltage output.

4. The three-electrode structure for desalination according to claim according to claim 3, further comprising:
   an influent pump connected to an influent water flow portion of the water flow channels;
   a directional valve connected to an effluent water flow portion of the water flow channels; and
   a conductivity meter connected to the directional valve.

5. The three-electrode structure for desalination according to claim according to claim 4, further comprising means for recovering energy from the CDI cell when the CDI cell is in a regeneration or discharge mode.

6. The three-electrode structure for desalination according to claim according to claim 4, wherein the influent pump is a peristaltic pump.

7. The three-electrode structure for desalination according to claim according to claim 4, wherein the central electrode is a ring having peripheral dimensions substantially equal to the first and second current collectors.

* * * * *